US010628352B2

(12) United States Patent
Edmiston (10) Patent No.: US 10,628,352 B2
(45) Date of Patent: Apr. 21, 2020

(54) HETEROGENEOUS MULTI-PROCESSOR DEVICE AND METHOD OF ENABLING COHERENT DATA ACCESS WITHIN A HETEROGENEOUS MULTI-PROCESSOR DEVICE

(71) Applicant: FREESCALE SEMICONDUCTOR, INC., Austin, TX (US)

(72) Inventor: Graham Edmiston, Scotland (GB)

(73) Assignee: NXP USA, Inc., Austin, TX (US)

( * ) Notice: Subject to any disclaimer, the term of this patent is extended or adjusted under 35 U.S.C. 154(b) by 185 days.

(21) Appl. No.: 15/213,875

(22) Filed: Jul. 19, 2016

(65) Prior Publication Data

US 2018/0024951 A1 Jan. 25, 2018

(51) Int. Cl.
*G06F 9/46* (2006.01)
*G06F 13/28* (2006.01)
*G06F 3/06* (2006.01)
*G06F 9/48* (2006.01)

(52) U.S. Cl.
CPC ............ *G06F 13/28* (2013.01); *G06F 3/0613* (2013.01); *G06F 3/0659* (2013.01); *G06F 3/0683* (2013.01); *G06F 9/4881* (2013.01)

(58) Field of Classification Search
CPC ...... G06F 13/28; G06F 3/0613; G06F 3/0659; G06F 3/0683; G06F 9/4881; G06F 9/5016
See application file for complete search history.

(56) References Cited

U.S. PATENT DOCUMENTS

| 5,493,673 | A | 2/1996 | Rindos, III et al. |
| 5,796,939 | A | 8/1998 | Berc et al. |
| 5,982,842 | A | 11/1999 | Ohtsuka et al. |
| 6,026,460 | A | 2/2000 | David et al. |

(Continued)

FOREIGN PATENT DOCUMENTS

| CN | 101304374 | 11/2008 |
| WO | 2009098542 A1 | 8/2009 |
| WO | 2012143757 A1 | 10/2012 |

OTHER PUBLICATIONS

Edmiston, Graham, "Method, Apparatus, and System for Unambiguous Parameter Sampling in a Heterogeneous Multi-Core or Multi-Threaded Processor Environment", filed Mar. 30, 2015, U.S. Appl. No. 14/672,596.

(Continued)

*Primary Examiner* — James J Lee (57) ABSTRACT

A heterogeneous multi-processor device having a first processor component arranged to issue a data access command request, a second processor component arranged to execute a set of threads, a task scheduling component arranged to schedule the execution of threads by the second processor component, and an internal memory component. In response to the data access command request being issued by the first processor component, the task scheduling component is arranged to wait for activities relating to the indicated subset of threads to finish, and when the activities relating to the indicated subset of threads have finished to load a command thread for execution by the second processor component, the command thread being arranged to cause the second processor component to read the indicated data from the at least one region of memory and make the read data available to the first processor component.

19 Claims, 8 Drawing Sheets

(56) References Cited

U.S. PATENT DOCUMENTS

| | | | |
|---|---|---|---|
| 6,211,317 B1 | 4/2001 | Albrecht et al. | |
| 6,233,243 B1 | 5/2001 | Ganmukhi et al. | |
| 6,556,571 B1 | 4/2003 | Shahrier et al. | |
| 6,671,275 B1 | 12/2003 | Wong et al. | |
| 6,728,949 B1 | 4/2004 | Bryant et al. | |
| 6,745,258 B1 | 6/2004 | Pellegrino et al. | |
| 6,925,424 B2 | 8/2005 | Jones et al. | |
| 6,928,470 B1 | 8/2005 | Hamlin | |
| 6,952,824 B1 | 10/2005 | Hooper et al. | |
| 7,103,683 B2 | 9/2006 | Madukkarumukumana et al. | |
| 7,221,655 B2 | 5/2007 | Luk | |
| 7,328,364 B1 | 2/2008 | Leong et al. | |
| 7,391,787 B1 | 6/2008 | McCrosky | |
| 7,613,201 B1 | 11/2009 | Yang et al. | |
| 7,653,086 B2 | 1/2010 | Beser | |
| 7,707,281 B2 | 4/2010 | Baretzki | |
| 7,769,015 B2 | 8/2010 | Huang et al. | |
| 7,805,706 B1 | 9/2010 | Ly et al. | |
| 7,921,262 B1 | 4/2011 | Dash et al. | |
| 7,979,252 B2 | 7/2011 | Horvitz et al. | |
| 8,045,662 B2 | 10/2011 | Zhuang et al. | |
| 8,065,647 B2 | 11/2011 | Stevens | |
| 8,136,124 B2 | 3/2012 | Kosche et al. | |
| 8,155,082 B2 | 4/2012 | Yamaguchi et al. | |
| 8,176,351 B2 | 5/2012 | Castro et al. | |
| 8,276,142 B2 | 9/2012 | Alameldeen et al. | |
| 8,286,139 B2 | 10/2012 | Jones et al. | |
| 8,295,287 B2 | 10/2012 | Chandhoke | |
| 8,358,589 B2 | 1/2013 | Apostol et al. | |
| 8,621,464 B2 | 12/2013 | Dawson et al. | |
| 8,649,354 B2 | 2/2014 | Kenington et al. | |
| 8,762,951 B1 | 6/2014 | Kosche et al. | |
| 8,626,241 B2 | 9/2014 | Wolczko et al. | |
| 8,839,271 B2 | 9/2014 | Jones et al. | |
| 8,843,684 B2 | 9/2014 | Jones et al. | |
| 9,231,858 B1 | 1/2016 | Greifeneder et al. | |
| 9,258,246 B2 | 2/2016 | Edmiston | |
| 9,262,235 B2 | 2/2016 | Tillier | |
| 9,367,321 B2 | 6/2016 | May | |
| 9,612,881 B2 | 4/2017 | Edmiston | |
| 9,843,255 B1 | 12/2017 | Goumballa et al. | |
| 2002/0118692 A1 | 8/2002 | Oberman et al. | |
| 2003/0167348 A1 | 9/2003 | Greenblat | |
| 2003/0172189 A1 | 9/2003 | Greenblat | |
| 2003/0208521 A1 | 11/2003 | Brenner et al. | |
| 2004/0153700 A1 | 8/2004 | Nixon et al. | |
| 2004/0168078 A1 | 8/2004 | Brodley et al. | |
| 2005/0021936 A1 | 1/2005 | Bailey et al. | |
| 2005/0117575 A1 | 6/2005 | Konda | |
| 2005/0240745 A1 | 10/2005 | Iyer et al. | |
| 2005/0251639 A1 | 11/2005 | Vishin et al. | |
| 2005/0270173 A1 | 12/2005 | Boaz | |
| 2006/0114907 A1 | 6/2006 | Wu | |
| 2006/0159103 A1* | 7/2006 | Jain | G06F 12/0815 370/395.7 |
| 2006/0282638 A1 | 12/2006 | Oshima et al. | |
| 2007/0174828 A1* | 7/2007 | O'Brien | G06F 8/451 717/151 |
| 2008/0019395 A1 | 1/2008 | Aithal | |
| 2008/0104659 A1 | 5/2008 | West et al. | |
| 2008/0184233 A1 | 7/2008 | Norton et al. | |
| 2008/0186983 A1 | 8/2008 | Dielissen et al. | |
| 2008/0192661 A1 | 8/2008 | Hamamoto et al. | |
| 2008/0201561 A1* | 8/2008 | Bates | G06F 9/463 712/228 |
| 2009/0240895 A1 | 9/2009 | Nyland et al. | |
| 2009/0248935 A1 | 10/2009 | Ehrlich et al. | |
| 2010/0046539 A1 | 2/2010 | Frohna et al. | |
| 2010/0083267 A1 | 4/2010 | Adachi et al. | |
| 2010/0125717 A1 | 5/2010 | Navon | |
| 2010/0162265 A1 | 6/2010 | Heddes | |
| 2010/0205245 A1 | 8/2010 | Le Scouarnec et al. | |
| 2010/0250811 A1 | 9/2010 | Kawashita et al. | |
| 2010/0332698 A1 | 12/2010 | Muller | |
| 2011/0149850 A1 | 6/2011 | Sashihara | |
| 2011/0153822 A1 | 6/2011 | Rajan et al. | |
| 2011/0283262 A1 | 11/2011 | Ceze et al. | |
| 2011/0302336 A1 | 12/2011 | Naylor | |
| 2012/0014489 A1 | 1/2012 | Liu et al. | |
| 2012/0066683 A1 | 3/2012 | Srinath | |
| 2012/0072916 A1 | 3/2012 | Hintermeister et al. | |
| 2012/0081378 A1 | 4/2012 | Roy et al. | |
| 2012/0159245 A1 | 6/2012 | Brownlow et al. | |
| 2012/0188987 A1 | 7/2012 | Chin et al. | |
| 2012/0290718 A1 | 11/2012 | Nethercutt | |
| 2013/0097384 A1 | 4/2013 | Suzuki et al. | |
| 2013/0275985 A1 | 10/2013 | Lim et al. | |
| 2013/0275989 A1* | 10/2013 | Xu | G06F 9/5022 718/104 |
| 2014/0006757 A1* | 1/2014 | Assarpour | G06F 9/38 712/226 |
| 2014/0019803 A1* | 1/2014 | Busaba | G06F 11/1438 714/16 |
| 2014/0029625 A1 | 1/2014 | Edmiston | |
| 2014/0089635 A1* | 3/2014 | Shifer | G06F 9/30076 712/30 |
| 2014/0115374 A1 | 4/2014 | Iyer et al. | |
| 2014/0201556 A1 | 7/2014 | Attar | |
| 2014/0215162 A1 | 7/2014 | Steeley, Jr. et al. | |
| 2014/0344831 A1 | 11/2014 | Levine | |
| 2014/0351825 A1 | 11/2014 | Xu et al. | |
| 2015/0054836 A1 | 2/2015 | Bolz et al. | |
| 2015/0074668 A1 | 3/2015 | Burka et al. | |
| 2015/0135182 A1* | 5/2015 | Liland | G06F 9/3867 718/102 |
| 2015/0139653 A1 | 5/2015 | Binkert et al. | |
| 2015/0143343 A1 | 5/2015 | Weiss et al. | |
| 2015/0223198 A1 | 8/2015 | Du et al. | |
| 2015/0324198 A1 | 11/2015 | Alsup et al. | |
| 2015/0347178 A1* | 12/2015 | Magee | G06F 9/4881 718/103 |
| 2016/0041933 A1 | 2/2016 | Trojanowski et al. | |
| 2016/0173335 A1 | 6/2016 | Edmiston | |
| 2016/0173416 A1 | 6/2016 | Edmiston | |
| 2016/0292017 A1 | 10/2016 | Du | |
| 2016/0323141 A1 | 11/2016 | Joshi et al. | |
| 2017/0003972 A1* | 1/2017 | Elliott | G06F 9/3851 |
| 2017/0358329 A1 | 12/2017 | Goumballa et al. | |

OTHER PUBLICATIONS

Burns, Alan, "Preemptive Priority Based Scheduling: An Appropriate Engineering Approach," University of York, Department of Computer Science, 1993, 24 Pages.

Notice of Allowance, U.S. Appl. No. 14/568,298, dated Mar. 27, 2018 15 pages.

Office action, Final Rejection, U.S. Appl. No. 15/213,875, dated Jan. 1, 2018 25 pages.

Office action, Non-Final Rejection, U.S. Appl. No. 14/568,298, dated Jun. 29, 2017 29 pages.

Office action, Non-Final Rejection, U.S. Appl. No. 15/213,875, dated Aug. 15, 2017 30 pages.

U.S. Appl. No. 14/568,298, Edmiston, Graham et al.: "Method and Apparatus for Implementing Deterministic Response Frame Transmission", filed Dec. 12, 2014.

U.S. Appl. No. 15/213,875, Edmiston, Graham: "Network Interface Module and a Method of Changing Network Configuration Parameters Within a Network Device", filed Dec. 12, 2014.

Cook, B., "Proving Thread Termination", ACM, PLDI'07, pp. 320-330, 2007.

Malkowski, S., "Challenges and Opportunities in Consolidation at High Resource Utilization: Non-monotonic Response Time Variations in n-Tier Applications", IEEE. Fifth International Conference on Cloud Computing, pp. 162-169, 2012.

Non-Final office action dated Jun. 3, 2016 in U.S. Appl. No. 14/672,596.

Notice of Allowance dated Dec. 2, 2016 in U.S. Appl. No. 14/672,596.

Non-Final Office Action dated Aug. 15, 2017 in U.S. Appl. No. 14/568,321.

Final office action dated Jan. 25, 2018 in U.S. Appl. No. 14/568,321.

(56) References Cited

OTHER PUBLICATIONS

Non-final office action dated Apr. 5, 2019 in U.S. Appl. No. 14/568,321.
Office action, Non-Final Rejection, U.S. Appl. No. 14/568,321, dated Oct. 2, 2018 34 pages.
Notice of Allowance, U.S. Appl. No. 14/568,298, dated Sep. 25, 2018 23 pages.
Notice of Allowance dated Sep. 18, 2019 for U.S. Appl. No. 14/568,321.

* cited by examiner

HETEROGENEOUS MULTI-PROCESSOR DEVICE AND METHOD OF ENABLING COHERENT DATA ACCESS WITHIN A HETEROGENEOUS MULTI-PROCESSOR DEVICE

FIELD OF THE INVENTION

This invention relates to a heterogeneous multi-processor device, and a method of enabling coherent data access within a heterogeneous multi-processor device.

BACKGROUND OF THE INVENTION

Figure 1:
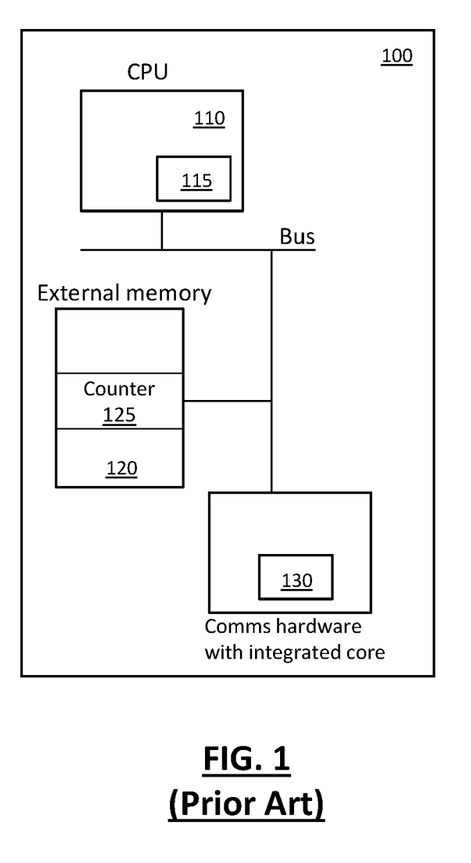
FIG. 1 illustrates a simplified block diagram of a conventional multi-processor system.

In certain applications, software executing on one processing component may be required to access data that is updated by software executing on another processing component. FIG. 1 illustrates a simplified block diagram of a conventional processing system 100 whereby software executing on a first processing component consisting of a central processing unit (CPU) 110 is required to access data within external memory 120 that is updated or otherwise modified by software executing on a second processing component consisting of an integrated processing core of a communications hardware module 130.

A problem occurs when multiple threads executing on the CPU 110 are required to concurrently access the data within the external memory 120, or if a single thread executing on the CPU 110 is required to perform, for example, a read-modify-write operation on the data. Because such scenarios require multiple, temporally dislocated accesses of the data by the CPU 110, there is a possibility that the data may be updated or otherwise modified by the second processing component 130 between the accesses of the data by the CPU 110.

For example, the CPU 110 issues a read-modify-write transaction to sample and clear a counter value 125 in external memory 120. Such a counter value 125 might be for a number of packets received that has a direct correlation with performance or bandwidth used. The CPU 110 thus is arranged to read the counter value 125 at the end of a user's service or a measurement over a specific period of time. After reading the counter value 125 it is reset, ready to be used when the next user starts or when the next measurement period begins.

In response to the read-modify-write transaction being issued by the CPU 110, the counter value 125 is read into a register 115 of the CPU 110. Meanwhile, the integrated core 130 on the communications hardware reads the counter value 125, following which a write transaction from the CPU 110 clears (resets) the counter value 125. The integrated core 130, unaware of the counter value 125 being cleared by the CPU 110, increments the original counter value 125 that it previously read and writes it back to external memory 120. As a result, the counter value 125 within external memory 120 is no longer valid and has become indeterminate.

In order to avoid such situations occurring, synchronization is required between the two processing components 110, 130 to ensure the data within the external memory remains coherent, deterministic and uncorrupted.

Conventional systems rely on cache algorithms and features to guarantee coherency of data accessible my multiple processing components. Such systems use schemes that each processing component must be aware of and adhere to, and as a consequence such systems are generally limited to being homogeneous in nature, with all processing components containing the same hardware for coherency and using the same bus and associated signals, snooping mechanisms etc.

However, conventional approaches that rely on rely on cache algorithms and features would be prohibitively expensive and complex to implement in heterogeneous processor systems, such as the system 100 illustrated in FIG. 1.

SUMMARY OF THE INVENTION

The present invention provides a heterogeneous multi-processor device, and a method of enabling coherent data access within a heterogeneous multi-processor device as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

According some examples of the present invention, there is provided a method and apparatus that allows application program code executing on a first processor component within a heterogeneous multi-processor device to issue a command request to access data that is not processed until all threads attributed to the data to be accessed executing on a second processor component have finished being executed. Once the threads attributed to the data to be accessed have finished being executed, a command thread is loaded onto the second processor component that makes the data to be accessed available to the first processor component, for example by copying it into a predetermined area of memory accessible by the first processor component.

By waiting until the threads attributed to the data to be accessed have finished being executed, the command thread is able to read multiple states/counters and other parameters in a temporally aligned manner, thereby providing the application program code executing on the first processor component with an accurate snapshot of the system state.

Figure 2:
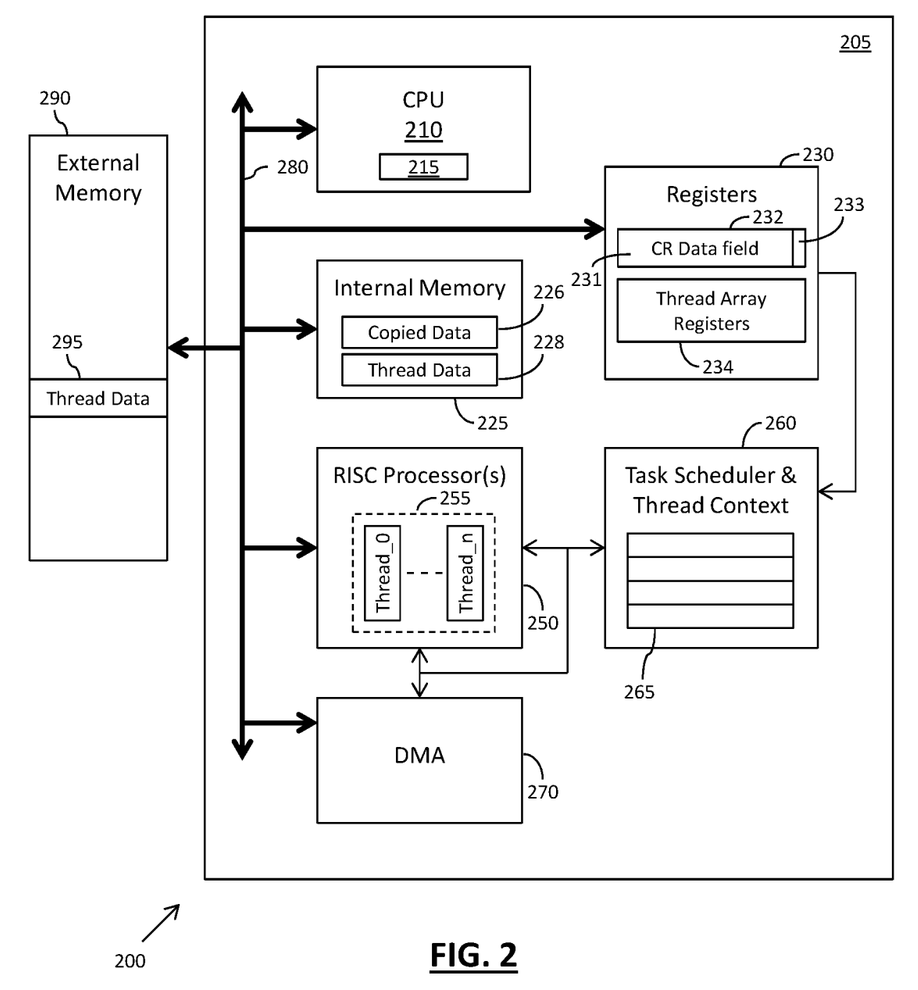
FIG. 2 schematically illustrated a simplified block diagram of an example of a heterogeneous multi-processor device.

Referring now to FIG. 2, there is schematically illustrated a simplified block diagram of an example of a heterogeneous multi-processor device 200. In the example illustrated in FIG. 2, the heterogeneous multi-processor device 200 is implemented within an integrated circuit device 205. The heterogeneous multi-processor device 200 of FIG. 2 includes a first set of processor components consisting of one or more application processor components arranged to execute application program code, such as the central processing unit (CPU) 210 illustrated in FIG. 2. The heterogeneous multi-processor device 200 further includes a second set of processor components consisting of one or more further processor components, such as the RISC (reduced instruction set computer) processor core 250 illustrated in FIG. 2.

The application processor component (CPU) 210 will hereinafter be referred to as the 'first processor component' 210 and the further processor component (RISC) 250 will hereinafter be referred to as the 'second processor component' 250. Furthermore, the first and second processor components 210, 250 will individually be referred to in the singular for simplicity and ease of understanding. However, it will be appreciated that the term 'first processor component' as used within the description and in the claims is intended to encompass one or more application processor components within the first set of processor components, and the term 'second processor component' as used within the description and in the claims is intended to encompass one or more further processor components within the second set of processor components.

The second processor component 250 is arranged to execute a set of threads, indicated generally at 255. A task scheduling component 260 is arranged to control when threads are executed by the second processor component 250, and stores therein thread scheduling and context information 265 for managing the scheduling of the threads 255 and for configuring the second processor 250 to execute the threads 255.

In the illustrated example, the heterogeneous multi-processor device 200 further includes an internal memory component 225 and a direct memory access (DMA) component 270. The heterogeneous multi-processor device 200 illustrated in FIG. 2 further includes registers 230 and an interconnect component 280 for providing communication between the various components of the heterogeneous multi-processor device 200. The registers 230 include a command register 232 and thread array registers 234. The interconnection component 280 may consist of, for example, one or more bus components, one or more crossbar switch components, etc. In the illustrated example, the interconnection component 280 of the heterogeneous multi-processor device 200 is coupled to external memory 290, for example via a memory controller component (not shown). The external memory 290 may consist of, for example, one or more RAM (Random access memory) modules. Significantly, accessing data within the external memory 290 is a relatively high latency operation compared with accessing data within the internal memory 225 which may be directly accessible by the processor components 210, 250 using load/store instructions.

When an application, indicated generally at 215, executing on the first processor component 210 requires access (e.g. a read-modify-write access) to mutable data from one or more threads 255 executing on the second processor component 250 stored within internal memory, such as data 228, or in external memory 290, such as data 295, the application code 215 is arranged to cause the first processor component 210 to issue a data access command request, and to output an indication of the mutable data 228, 295 to be accessed and an indication of a subset of the set of threads 255 associated with the mutable data 228, 295 to be accessed. For example, the application code 215 executing on the first processor component 210 may be arranged to indicate the subset of threads by setting a respective bit within the thread array register 234 corresponding to thread within the subset of threads. Furthermore, the application code 215 may be arranged to indicate the mutable data 228, 295 to be accessed by configuring (programming) one or more address values and data size indicators within a data field 231 of the command register 232, and to issue the data access command request by setting an enable bit-field 233 within the command register 232.

In some examples, when the application code 215 requires access to mutable data from one or more threads 255 executing on the second processor component 250, prior to causing the first processor component 210 to issue a data access command request, the application code 215 may be arranged to check that a data access command request previously issued by another program executing on the CPU 210 is not still pending, for example by checking the enable bit-field 233.

In the illustrated example, the task scheduling component 260 is arranged to monitor the command register 232, and in particular to monitor the enable bit-field 233 within the command register 232. Upon the enable bit-field 233 within the command register 232 being set, indicating that the first processor component has issued a data access command request, the task scheduling component 260 is arranged to identify the subset of threads associated with the mutable data 228, 295 to be accessed. For example, the task scheduling component 260 in the illustrated example is arranged to identify the subset of threads associated with the mutable data 228, 295 to be accessed by reading the respective bits within the thread array registers 234. The task scheduling component 260 then waits for activities relating to the indicated subset of threads to finish, and when the activities relating to the indicated subset of threads have finished loads a command thread for execution by the second processor component 250. In particular, the task scheduling component 260 is arranged to wait for executing tasks of threads within the indicated subset of threads to finish before loading the command thread for execution by the second processor component. It is further contemplated that the task scheduling component 260 is also arranged to wait for direct memory accesses issued by threads within the indicated subset of threads to complete before loading the command thread for execution by the second processor component.

Figure 3:
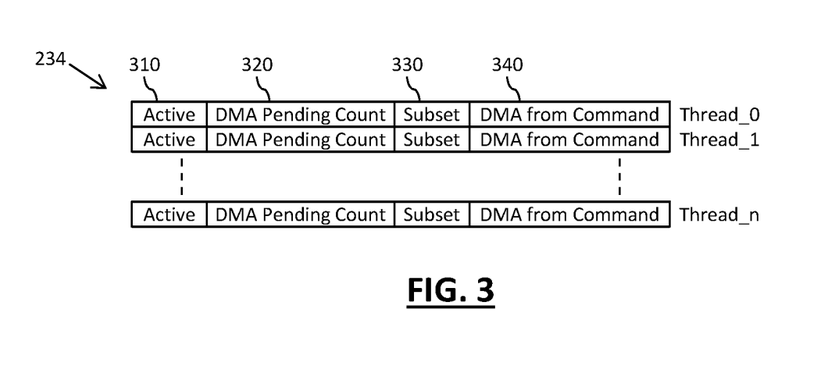
FIG. 3 illustrates an example of thread array registers.

For example, FIG. 3 illustrates an example of the thread array registers 234. Each of the set of threads 255 is associated with a thread array register 234. Each thread array register 234 includes an active bit-field 310 indicating whether the thread is 'active' (i.e. is being executed on the second processor component 250). Each thread array register 234 further includes a DMA (direct memory access) pending counter value 320. The DMA pending counter value 320 is incremented for each DMA issued by the associated thread, and decremented when a DMA issued by the associated thread completes, and the task scheduler component 260 is prevented from loading a thread for execution until the associated DMA pending counter 510 equals zero.

Thus, upon the enable bit-field 233 within the command register 232 being set, indicating that the first processor component 210 has issued a data access command request, the task scheduling component 260 is arranged to wait for the active bit-fields 310 of the threads within the indicated subset of threads to be 'cleared', and for the DMA pending counter values 320 of the threads within the indicated subset of threads to equal zero, before loading the command thread for execution by the second processor component.

In the example illustrated in FIG. 3, each thread array register 234 further includes a subset bit-field 330, and the application code 215 executing on the first processor component 210 is arranged to indicate the subset of threads associated with the mutable data 228, 295 to be accessed by setting the subset bit-field 330 within the thread array register 234 corresponding to each thread within the subset of threads.

In some examples, the task scheduling component 260 is further arranged to mask the indicated subset of threads from being loaded for execution by the second processor component 250. In this manner, not only does the task scheduling component 260 wait for the respective threads to finish being executed, but also prevents them from subsequently being loaded for execution whilst the mutable data associated with them is being accessed by the command thread. As a result, modification of the mutable data 228, 290 by the threads is prevented. Thus, and as described in greater detail below, the command thread is able to access mutable data 228, 295 for multiple threads in a temporally aligned manner, without the mutable data being modified or changed during the process of accessing the data. In this manner, the application code 215 executing on the first processor component 210 is able to obtain an accurate 'snapshot' of the mutable data 228, 295.

The command thread loaded by the task scheduling component 260 is arranged to cause the second processor component 250 to read the indicated mutable data 228, 295 from memory and make the read data 228, 295 available to the first processor component 210, for example by copying the read data to a region 226 of memory accessible by the first processor component 210. In the illustrated example, the region 226 of memory accessible by the first processor component 210 is within internal memory 225. However, it will be appreciated that the region of memory accessible by the first processor component 210 and into which the read data is copied may equally be located within external memory 290. Where the data to be accessed is located within external memory 290, such as the data 295 in the example illustrated in FIG. 2, the command thread may be arranged to cause the second processor component 250 to issue a direct memory access request to the DMA component 270 to retrieve the data 295 from external memory 290.

In some examples, for example whereby the application code 215 executing on the first processor component 210 requires read-modify-write access to mutable data 228, 295, the command thread may be further arranged to cause the second processor component 250 to overwrite the indicated data in memory after it has been read. For example, the command thread may be arranged to cause the second processor component 250 to overwrite the, or each, mutable data value with a zero value to reset or 'clear' the mutable data value being accessed. Where the data to be accessed is located within external memory 290, such as the data 295 in the example illustrated in FIG. 2, the command thread may be arranged to cause the second processor component 250 to issue a further direct memory access request to the DMA component 270 to overwrite the data 295 in external memory 290.

Once the mutable data 228, 295 has been copied into the region 226 of memory accessible by the first processor component 210, or respective DMA(s) issued in the case of the mutable data 295 in external memory, the command thread may be arranged to cause the second processor component 250 to signal or otherwise indicate to the task scheduling component 260 that the respective mutable data 228, 295 has been made available (or is in the process of being made available) to the first processor component 210. Such an indication may alternatively involve the command thread finishing execution (e.g. the active bit 310 within the thread array register 234 for the command thread being cleared). Upon receipt of such an indication that the respective mutable data 228, 295 has been (or is in the process of being) made available to the first processor component 210, the task scheduling component 260 is arranged to wait for any DMAs issued by the command thread to complete, for example as indicated by the DMA pending count field 320 within the thread array register 234 for the command thread. Once all DMAs issued by the command thread have completed, and thus once the respective mutable data 228, 295 has been copied into the region 226 of memory accessible by the first processor component 210, the task scheduling component 260 may then clear the enable bit-field 233 within the command register, indicating to the first processor component 210 that the required mutable data 228, 295 is available within internal memory 225. The task scheduling component 260 may further unmask the subset of threads from being loaded for execution on the second processor component 250 by clearing the subset field 330 within the respective thread array registers 234. Accordingly, upon the task scheduling component 260 clearing the enable bit-field 233 within the command register, the application code 215 executing on the first processor component 210 is able to access the mutable data 228, 295 from the region 226 of memory accessible by the first processor component 210.

Although single instances of the command register 232 and thread array registers have been illustrated and described, it is contemplated that multiple command registers 232 and multiple sets of thread array registers 234 may be implemented. For example, where multiple different data access commands are supported, a command register 232 and set of thread array registers 234 may be implemented for each supported data access command.

Referring now to FIGS. 4 to 8, there is illustrated an example of a method of enabling coherent data access within a heterogeneous multi-processor device, such as the heterogeneous multi-processor device 200 of FIG. 2.

Figure 4:
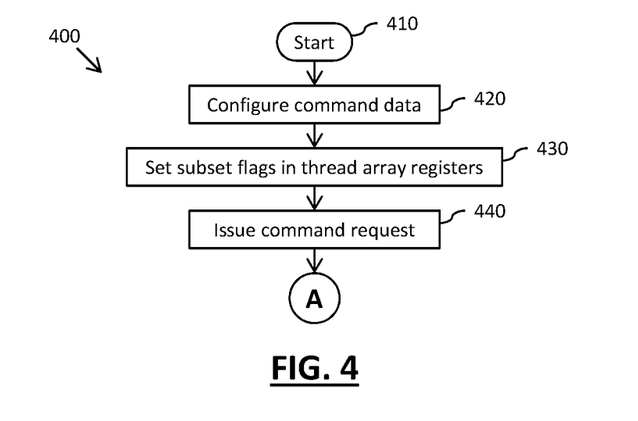
FIGS. 4 to 8 illustrate an example of a method of enabling coherent data access within a heterogeneous multi-processor device.

The method starts with the flowchart 400 of FIG. 4, which for the example illustrated in FIG. 2 may be implemented within the first processor component 210. This part of the method starts at 410, for example when the application code 215 executing on the first processor component 210 requires access to mutable data 228, 295 for one or more threads executing on the second processor component 250 stored within memory 290. Command data for enabling access to the mutable data 228, 295 is configured at 420, for example within the data field 231 of the command register 232 by the first processor component 210. In particular, such command data may consist of an indication of the mutable data 228, 295 to be accessed, for example one or more address(es) in memory identifying the location(s) of the mutable data 228, 295 to be accessed, the number and sizes of data elements/blocks to be accessed etc. An indication of the subset of threads is output, at 430, for example by way of the first processing component 210 setting a respective bit within a thread array register 234 corresponding to each thread within the subset of threads. A data access command request is then issued, at 440, for example by way of the first processing component 210 setting an enable bit-field 233 within the command register 232.

Figure 5:
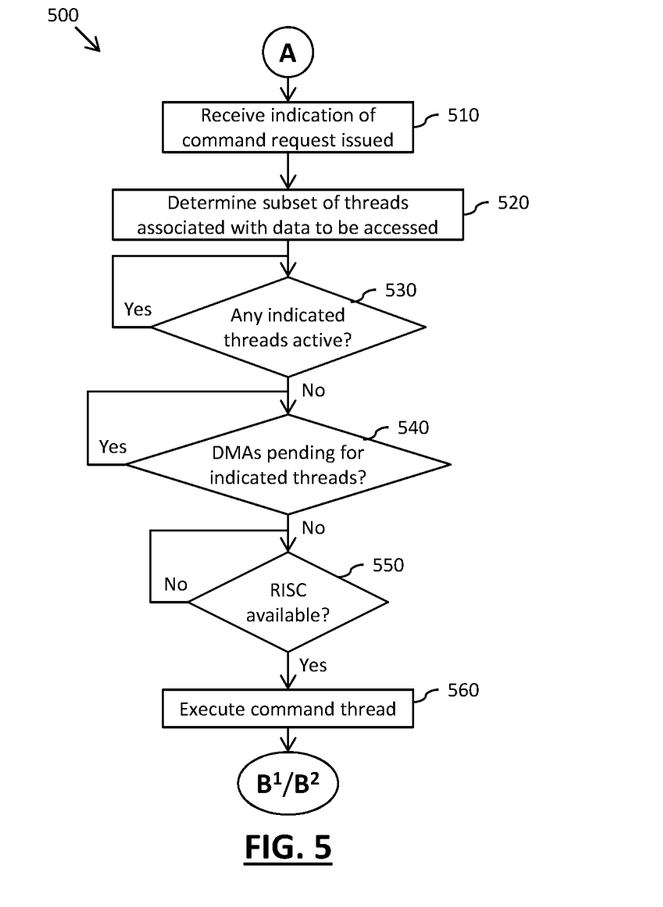

The method then moves on to the flowchart 500 of FIG. 5, which for the example illustrated in FIG. 2 may be implemented within the task scheduling component 260. This part of the method starts, at 510, with receiving an indication of a data access command request being issued by the first processor component 210, for example such an indication consisting of the enable bit-field 233 within the command register 232 being set. Next, at 520, a subset of threads associated with data to be accessed is determined. For example, the subset of threads may be determined based on which thread array registers 234 have their subset bit-fields 330 set. In some examples, the method may further include masking the determined subset of threads from being loaded for execution by the second processor component. The method then waits for activities relating to the determined subset of threads to finish. In particular for the illustrated example, the method includes waiting for executing tasks of threads within the determined subset of threads to finish, at 530, and for direct memory accesses issued by threads within the determined subset of threads to complete, at 540. Once the activities relating to the determined subset of threads have finished, the method then involves causing the second processor component 250 to read data from memory and make the read data available to the first processor component 210. In particular for the illustrated example, the method includes waiting for the second processor component 250 to become available for executing a thread, at 550, and loading a command thread for execution, at 560, the command thread being arranged to cause the second processor component 250 to read data from memory and make the read data available to the first processor component 210.

Figure 6:
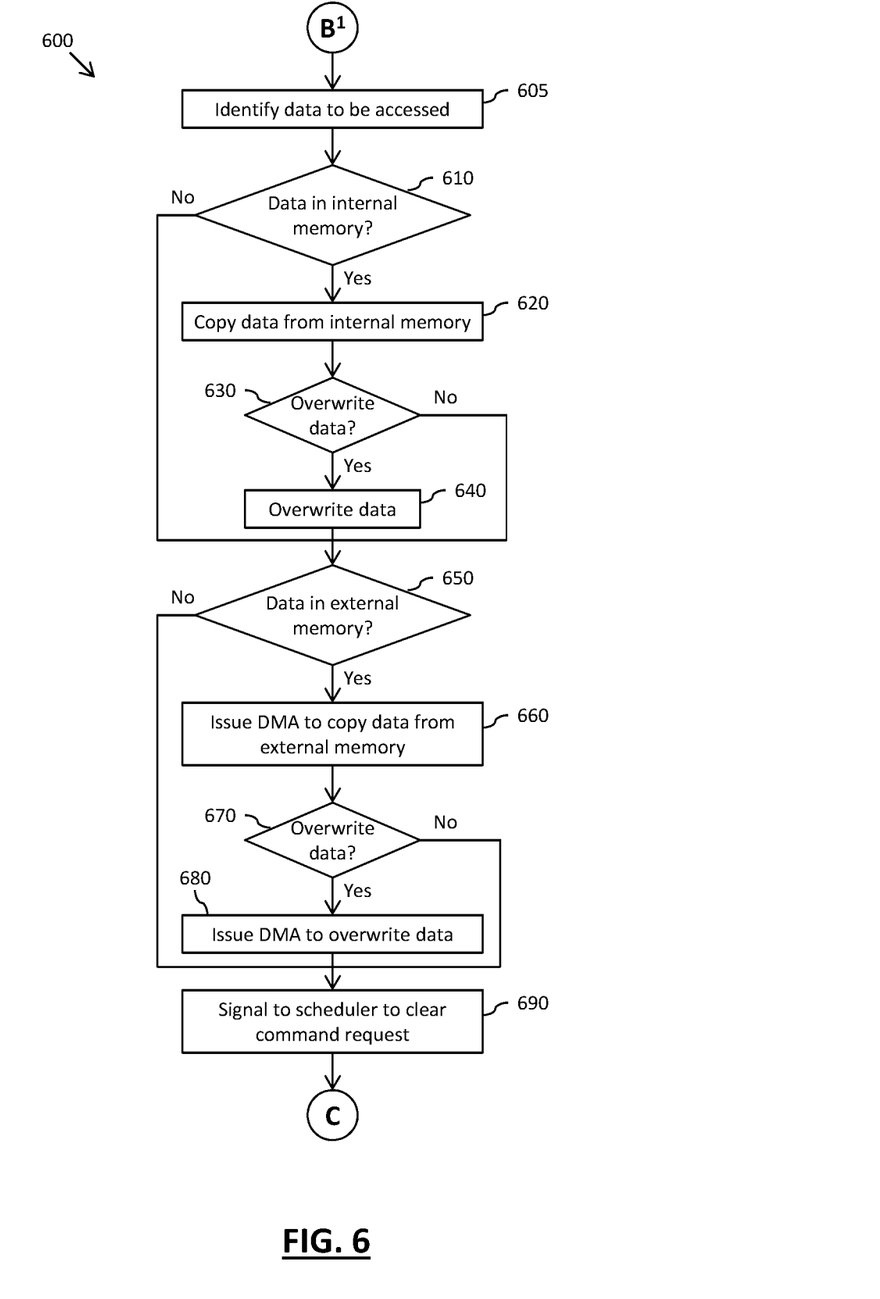

FIG. 6 illustrates a simplified flowchart 600 of an example of steps performed by the command thread loaded for execution by the second processor component 250. This part of the method starts at 605 with identifying the data to be accessed, for example based on command data configured within the data field 231 of the command register 232 by the first processor component 210, said command data consisting of, for example, one or more address(es) in memory identifying the location(s) of the mutable data 228, 295 to be accessed, the number and sizes of data elements/blocks to be accessed etc. Next, at 610, it is determined whether at least a part of the data to be accessed is located within internal memory, for example within the internal memory component 225. If it is determined that at least a part of the data to be accessed is located within internal memory, the method moves on to 620, where the data located in internal memory is copied to a region of memory accessible by the first processor component, such as the region 226 in FIG. 2. In the illustrated example, it is then determined whether the data is to be overwritten, at 630, for example where the access to be performed is a read-modify-write access. If it is determined that the data is to be overwritten, the method moves on to 640 where the data is overwritten. It is then determined whether at least a part of the data to be accessed is located within external memory, at 650. If it is determined that at least a part of the data to be accessed is located within external memory, the method moves on to 660, where a direct memory access is issued (for example to the DMA component 270 in FIG. 2) to copy the data from external memory to the region of memory accessible by the first processor component, such as the region 226 in FIG. 2. In the illustrated example, it is then determined whether the data is to be overwritten, at 670. If it is determined that the data is to be overwritten, the method moves on to 680 where a direct memory access is issued to overwrite the data within external memory. In the illustrated example, the task scheduling component is then signalled to clear the command request, at 690, before this part of the method ends.

Figure 7:
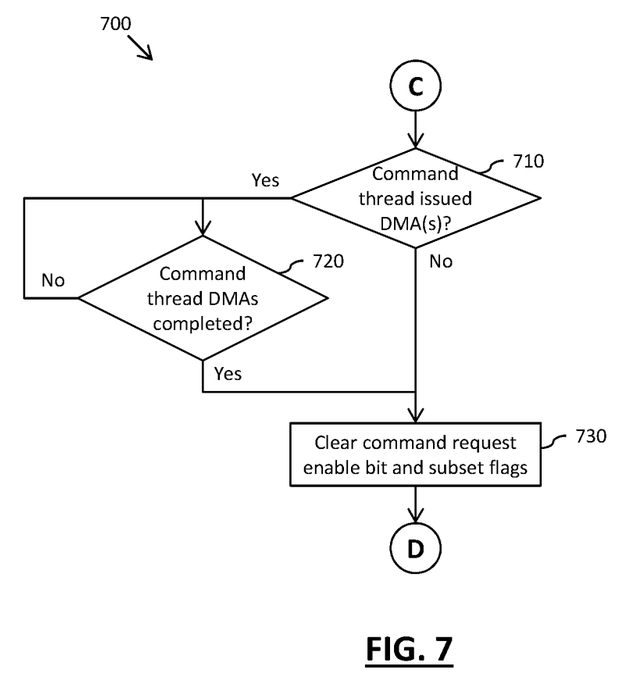

FIG. 7 illustrates a simplified flowchart 700 of a part of the method that may be implemented, for example, by the task scheduling component 260 upon receipt of an indication that the data to be accessed has been made available, or is in the process of being made available (e.g. via a pending direct memory access) to the first processor component 210. Such an indication may consist of a signal from the second processor component 250, or may consist of the execution of the command thread finishing. This part of the method starts at 710 where it is determined whether the command thread issued a direct memory access, for example based on the DMA pending count 320 of the thread array register 234 for the command thread. If it is determined that the command thread issued a direct memory access, the method moves on to 720 where the task scheduling component 260 waits until the direct memory accesses issued by the command thread complete. The command request enable bit-field 233 within the command register 232 and the subset bit-fields 330 within the thread array registers 234 are then cleared, at 730. By clearing the command request enable bit-field 233 within the command register 232, the task scheduling component 260 signals to the first processor component 210 that the data is available. Furthermore, by clearing the subset bit-fields 330 within the thread array registers 234, the task scheduling component 260 unmasks the threads, enabling them to subsequently be loaded for execution on the second processor component 250.

Figure 8:
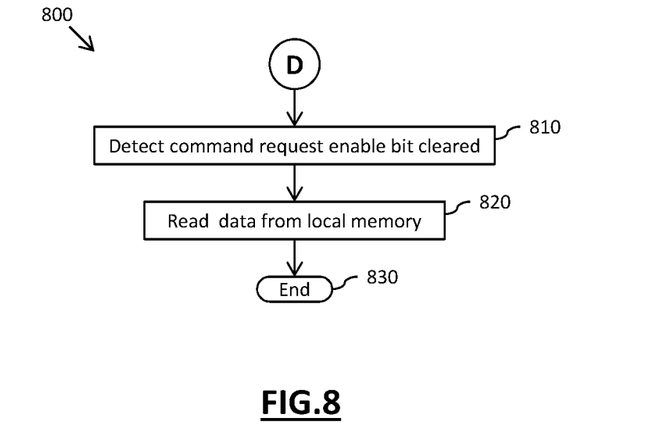

The method then moves on to the flowchart 800 of FIG. 8, where the first processor component 210 is arranged to detect the command request being cleared, at 810, and upon detection of the command request being cleared to access the data from, in the example illustrated in FIG. 2, the region 226 of internal memory into which the data was copied, at 820. The method then ends, at 830.

Figure 9:
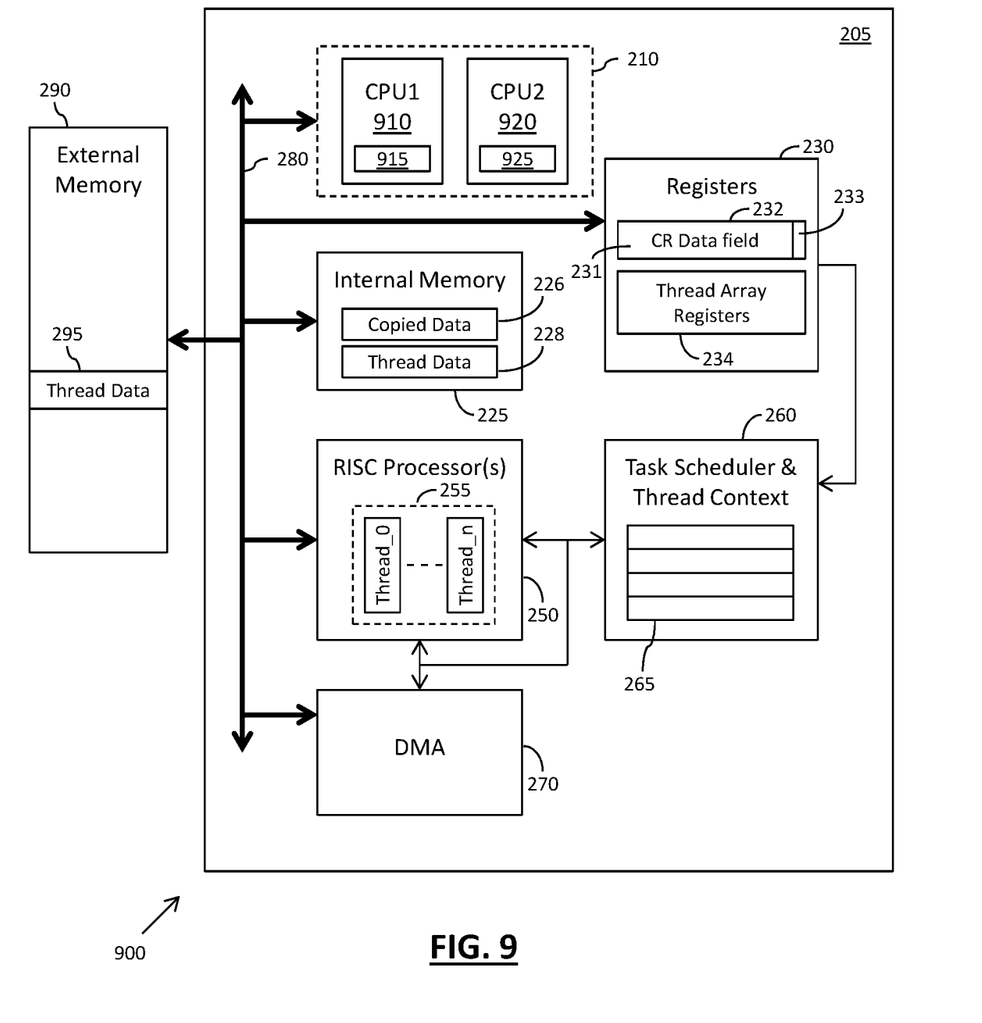
FIG. 9 schematically illustrated a simplified block diagram of an alternative example of a heterogeneous multi-processor device.

Referring now to FIG. 9, there is schematically illustrated a simplified block diagram of a further example of a heterogeneous multi-processor device 900. For clarity and ease of understanding, the same reference numerals have been used for features in common between the heterogeneous multi-processor device 900 illustrated in FIG. 9 and the heterogeneous multi-processor device 200 of FIG. 2, and it will be appreciated that, except where described below, the various components of the heterogeneous multi-processor device 900 illustrated in FIG. 9 may be assumed to operate in the same manner as the corresponding components of the heterogeneous multi-processor device 200 illustrated in FIG. 2.

In the example illustrated in FIG. 9, the first processor component 210 of the heterogeneous multi-processor device 900 consists of multiple processor cores, illustrated generally as CPU1 910 and CPU2 920 in FIG. 9, arranged to execute application program code, such as indicated at 915, 925. When application program code 915, 925 executing on a processing core 910, 920 of the first processor component 210 requires access to mutable data 228, 295 from one of more of the threads 255 executing on the second processor component 250, the application program code 915, 925 of the example illustrated in FIG. 9 is arranged to first determine whether a data access command request has already been issued, for example based on whether the enable-bit field 233 within the command register 232 is set or not. If a data access command request has already been issued (i.e.

the enable-bit field 233 is set), the application program code 915, 925 is arranged to wait until the previously issued command request to complete (e.g. as indicated by the enable bit-field 233 within the command register 232 being cleared). The application program code 915, 925 is then able to access the mutable data 228, 295 that has been made available to the first processor component 210, which in the illustrated example has been copied into the region 226 of memory. In this manner, the application program code 915, 925 is able to take advantage of the previously issued data access command request from another application program.

Figure 10:
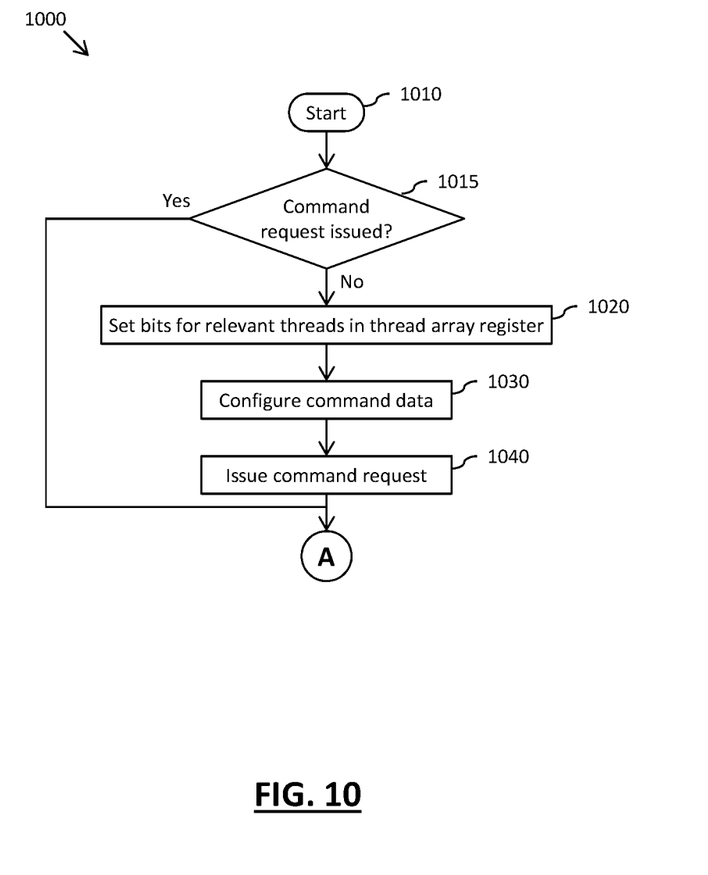
FIG. 10 illustrates a part of a method of enabling coherent data access within the heterogeneous multi-processor device of FIG. 9.

FIG. 10 illustrates a part of a method of enabling coherent data access within the heterogeneous multi-processor device 900 of FIG. 9 implemented within application program code 915, 925 executing on a processing core 910, 920 of the first processor component 210. The part of the method starts at 1010, for example when the application code 915 executing on the first processor core 910 requires access to mutable data 228, 295 for one or more threads executing on the second processor component 250 stored within memory 290. It is then determined whether a data access command request has already been issued, for example based on whether the enable-bit field 233 within the command register 232 is set or not. If a data access command request has already been issued (i.e. the enable-bit field 233 is set), this part of the method ends, and the application program code 915 waits for the previously issued data access command request to complete. Conversely, if it is determined that a data access command has not already been issued, command data for enabling access to the mutable data 228, 295 is configured at 1020, for example within the data field 231 of the command register 232 by the first processor component 210. In particular, such command data may consist of an indication of the mutable data 228, 295 to be accessed, for example one or more address(es) in memory identifying the location(s) of the mutable data 228, 295 to be accessed, the number and sizes of data elements/blocks to be accessed etc. An indication of the subset of threads is output, at 1030, for example by way of the first processing component 210 setting a respective bit within a thread array register 234 corresponding to each thread within the subset of threads. A data access command request is then issued, at 1040, for example by way of the first processing component 210 setting an enable bit-field 233 within the command register 232. The method then moves on to the flowchart 500 of FIG. 5.

In this manner, different application programs 915, 925 executing on the first processor component 210 are able to access the same system state, which may be required in certain applications. Specifically, the different application programs 915, 925 are able to access mutable data coherently at differing locations and on differing interfaces within the system's addressable memory space, with the command thread being arranged to write all of the mutable data 228, 295 to a known region 226 within memory.

Figure 11:
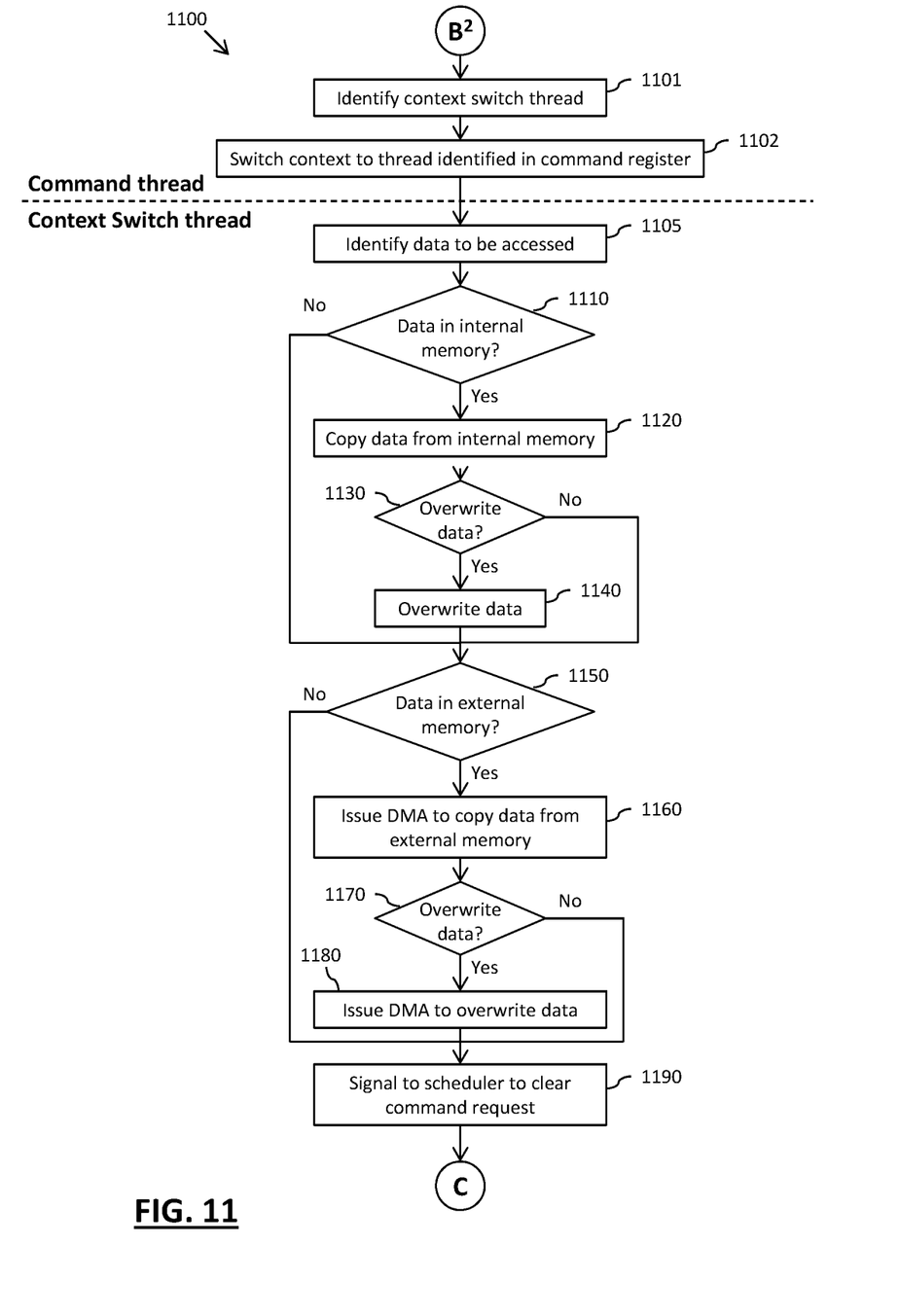
FIG. 11 illustrates a simplified flowchart of an alternative example of steps performed by a command thread.

FIG. 11 illustrates a simplified flowchart 1100 of an alternative example of steps performed by the command thread loaded for execution by the second processor component 250. This part of the method starts at 1101 with identifying a thread to switch context to. For example, the command thread may identify a thread to switch context by selecting one of the subset of threads indicated within the thread array registers. Alternatively, a specific thread may be identified within the data field 231 of the command register 232. Having identified a thread to switch context to, the command thread switches context to the identified thread, at 1102. For example, the command thread may be able to retrieve context information for the identified thread from the task scheduling component 260 and to load the context information into the second processing component 250 to cause the second processing component 250 to switch to executing the identified thread. In some examples, the command thread may be arranged to force the task scheduling component 260 to switch contexts from the command thread to the identified thread, overriding the masking of the identified thread. Once the context switch to the identified thread has been performed, the identified thread proceeds with identifying the data to be accessed, at 1105, for example based on command data configured within the data field 231 of the command register 232 by the first processor component 210. Next, at 1110, it is determined whether at least a part of the data to be accessed is located within internal memory, for example within the internal memory component 225. If it is determined that at least a part of the data to be accessed is located within internal memory, the method moves on to 1120, where the data located in internal memory is copied to a region of memory accessible by the first processor component, such as the region 226 in FIGS. 2 and 9. In the illustrated example, it is then determined whether the data is to be overwritten, at 1130, for example where the access to be performed is a read-modify-write access. If it is determined that the data is to be overwritten, the method moves on to 1140 where the data is overwritten. It is then determined whether at least a part of the data to be accessed is located within external memory, at 1150. If it is determined that at least a part of the data to be accessed is located within external memory, the method moves on to 1160, where a direct memory access is issued (for example to the DMA component 270 in FIGS. 2 and 9) to copy the data from external memory to the region of memory accessible by the first processor component, such as the region 226 in FIGS. 2 and 9. In the illustrated example, it is then determined whether the data is to be overwritten, at 1170. If it is determined that the data is to be overwritten, the method moves on to 1180 where a direct memory access is issued to overwrite the data within external memory. In the illustrated example, the task scheduling component is then signalled to clear the command request, at 1190, before this part of the method ends.

Switching context from the command thread to a different thread in this manner allows another command to be issued before direct memory accesses issued in response to the previous command request are complete. The direct memory accesses issued in response to the command request may be associated with the subset of threads by a DMA_from_Command bit-field 340 (FIG. 3) being set within the respective thread array registers 234. In this manner, the subset of threads may be prevented from being loaded for execution by the task scheduler component 260 whilst direct memory accesses issued in response to a command request are pending.

The invention may be implemented in part in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a tangible and non-transitory computer readable storage medium or transmitted to the computer system via a computer readable transmission medium. All or some of the computer program may be provided on computer readable media permanently, removably or remotely coupled to an information processing system. The tangible and non-transitory computer readable media may include, for example and without limitation, any number of the following: magnetic storage media including disk and tape storage media; optical storage media such as compact disk media (e.g., CD-ROM, CD-R, etc.) and digital video disk storage media; non-volatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the scope of the invention as set forth in the appended claims and that the claims are not limited to the specific examples described above.

Furthermore, because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Furthermore, the terms 'assert' or 'set' and 'negate' (or 'de-assert' or 'clear') are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively 'associated' such that the desired functionality is achieved. Hence, any two components herein combined to achieve a particular functionality can be seen as 'associated with' each other such that the desired functionality is achieved, irrespective of architectures or intermediary components. Likewise, any two components so associated can also be viewed as being 'operably connected,' or 'operably coupled,' to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense. In the claims, any reference signs placed between parentheses shall not be construed as limiting the claim. The word 'comprising' does not exclude the presence of other elements or steps then those listed in a claim. Furthermore, the terms 'a' or 'an,' as used herein, are defined as one or more than one. Also, the use of introductory phrases such as 'at least one' and 'one or more' in the claims should not be construed to imply that the introduction of another claim element by the indefinite articles 'a' or 'an' limits any particular claim containing such introduced claim element to inventions containing only one such element, even when the same claim includes the introductory phrases 'one or more' or 'at least one' and indefinite articles such as 'a' or 'an.' The same holds true for the use of definite articles. Unless stated otherwise, terms such as 'first' and 'second' are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A heterogeneous multi-processor device comprising:
   a first processor component, wherein the first processor component is of a first type of processor;
   a second processor component, wherein the second processor component is arranged to execute a set of threads, the second processor component is of a second type of processor, and the second type of processor is distinct from the first type of processor;
   a task scheduling component arranged to schedule the execution of threads by the second processor component; and
   an internal memory component, wherein:
   the first processor component is arranged to issue a data access command request, and to output an indication of data stored within at least one region of memory to be accessed and an indication of a subset of the set of threads associated with the data to be accessed; and
   in response to the data access command request being issued by the first processor component, the task scheduling component is arranged to wait for activities relating to the indicated subset of threads to finish, switch context from a command thread associated with the data access command request to a different thread while waiting for activities relating to the indicated subset of threads to finish and when the activities relating to the indicated subset of threads have finished to load the command thread for execution by the second processor component, the command thread being arranged to cause the second processor component to read the indicated data from the at least one region of memory and make the read data available to the first processor component.

2. The heterogeneous multi-processor device of claim 1, wherein the command thread is arranged to cause the second processor component to issue a direct memory access to retrieve at least a part of the indicated data from external memory.

3. The heterogeneous multi-processor device of claim 1, wherein, in response to the data access command request being issued by the first processor component, the task scheduling component is further arranged to mask the indicated subset of threads from being loaded for execution by the second processor component.

4. The heterogeneous multi-processor device of claim 3, wherein the task scheduling component is further arranged to unmask the indicated subset of threads in response to an indication from the second processor component that the indicated data has been read.

5. The heterogeneous multi-processor device of claim 1, wherein the task scheduling component is further arranged to clear the data access command request upon the indicated data being made available to the first processor.

6. The heterogeneous multi-processor device of claim 1, wherein, in response to the data access command request being issued by the first processor component, the task scheduling component is arranged to wait for executing tasks of threads within the indicated subset of threads to finish and for direct memory accesses issued by threads within the indicated subset of threads to complete before loading the command thread for execution by the second processor component.

7. The heterogeneous multi-processor device of claim 1, wherein the command thread is further arranged to cause the second processor component to overwrite the indicated data after it has read the indicated data.

8. The heterogeneous multi-processor device of claim 1, wherein the command thread is arranged to cause the second processor component to copy the indicated data to a region of memory accessible by the first processor component.

9. The heterogeneous multi-processor device of claim 1, wherein the first processor component is arranged to output the indication of the data to be accessed within a data field of a command request register, and to issue the data access command request by setting an enable bit within the command request register.

10. The heterogeneous multi-processor device of claim 1, wherein the first processor component is arranged to output the indication of the subset of threads by setting a respective bit within a thread array register corresponding to each thread within the subset of threads.

11. A method of enabling coherent data access within a heterogeneous multi-processor device; the method comprising:
   receiving an indication of a data access command request being issued by a first processor component, wherein the first processor component is a first type of processor;
   determining a subset of threads associated with data to be accessed, wherein the subset of threads is arranged to execute on a second processor component, the second processor component is a second type of processor, and the second type of processor is distinct from the first type of processor;
   waiting for activities relating to the determined subset of threads to finish;
   switching context from a data access command request thread to a different thread while waiting for activities relating to the determined subset of threads to finish; and
   when the activities relating to the determined subset of threads have finished, loading the data access command request thread for execution by the second processor component to read data from at least one region of memory and make the read data available to the first processor component.

12. The method of claim 11 further comprising causing the second processor component to issue a direct memory access to retrieve at least a part of the date from an external memory, wherein the at least a part of the data to be read is stored within at least one region of external memory.

13. The method of claim 11 further comprising, in response to receiving the indication of the data access command request being issued by the first processor component, masking the determined subset of threads from being loaded for execution by the second processor component.

14. The method of claim 13 further comprising unmasking the determined subset of threads in response to receiving an indication from the second processor component that the data has been read.

15. The method of claim 11 comprising, in response to receiving the indication of the data access command request being issued by the first processor component and before causing the second processor component to read data from at least one region of memory and make the read data available to the first processor component, waiting for executing tasks of threads within the determined subset of threads to finish and for direct memory accesses issued by threads within the determined subset of threads to complete.

16. The method of claim 11 further comprising causing the second processor component to overwrite the data in memory after reading the data.

17. The method of claim 11, wherein the method comprises causing the second processor component to copy the indicated data to a region of memory accessible by the first processor component.

18. The method of claim 11, wherein the method comprises the first processor component providing an indication of the data to be accessed within a data field of a command request register, and issuing the data access command request by setting an enable bit within the command request register.

19. The method of claim 11, wherein the method comprises the first processor component providing an indication of the subset of threads by setting a respective bit within a thread array register corresponding to each thread within the subset of threads.

* * * * *